Patented Mar. 9, 1943

2,313,693

UNITED STATES PATENT OFFICE 2,313,693

RECLAIMING NEOPRENE

Herbert A. Winkelmann, Chicago, Ill., assignor to Dryden Rubber Company, Chicago, Ill., a corporation of Illinois No Drawing. Application March 31, 1941,
Serial No. 386,117

2 Claims. (Cl. 260—36)

The invention relates to a process of reclaiming neoprene.

Neoprene is rubberlike polymerized chloroprene. It is commonly used as an oil resistant substitute for rubber. Neoprene may be cured or vulcanized by heating in the presence of magnesium oxide with or without sulfur. In its cured state it has similar non-thermoplastic properties to vulcanized rubber.

Attempts to reclaim cured neoprene by the use of softeners and heating in open steam have resulted in a product which does not cure very well.

I have discovered that if ground cured neoprene scrap containing magnesium oxide is subjected to hot acid for a sufficient time so as to react substantially all the magnesium oxide, and the acid treated product then heated with a plasticizer, preferably in open steam, a product is obtained which molds and cures very well. The reclaim so obtained is not merely a plasticized material but is a reclaimed neoprene which is again capable of being vulcanized.

All types of cured neoprene may be reclaimed by my process. The following are two typical cured neoprene compositions.

| | Parts by weight | |
|---|---|---|
| Neoprene E scrap | 100 | |
| Neoprene GN scrap | | 100 |
| MgO | 10 | 4 |
| ZnO | 5 | 5 |
| S | 0–1 | 0–1 |

The neoprene scrap may be reacted with any type of acid which will react with the magnesium oxide of the neoprene. Hydrochloric and sulfuric acids have been found commercially suitable.

The concentration of the acid may vary widely. Generally a hot dilute aqueous solution such as 10% acid is used.

The time and temperature for digesting the neoprene scrap in the acid may vary widely. The acid treatment preferably should be sufficient to convert substantially all of the magnesium oxide of the neoprene scrap into a salt of the acid. Heating of the neoprene scrap in 10% hydrochloric or sulfuric acid at near the boiling point of the solution for forty-eight hours gives satisfactory results and converts substantially all the magnesium oxide to magnesium chloride or magnesium sulfate, depending upon the acid used. Removal of these salts and acid by washing is preferably carried out and the material dried before incorporation of the plasticizer.

Any type of plasticizer for neoprene is suitable. Tricresyl phosphate, camphor, dibutyl phthalate, and pine oil are satisfactory.

The time and temperature of heat treatment of the plasticized material may be varied widely. It should be substantially above room temperature, preferably for several hours. Sheets having superior milling and molding characteristics are obtained when the heat treatment is in open steam of super-atmospheric pressure instead of using a dry heat treatment, which is suitable but not as satisfactory.

To more clearly set forth the practice in accordance with the invention and to more specifically point out the nature of the product and process contemplated thereby, several specific, illustrative examples are hereinafter set forth, it being understood that these examples illustrate several embodiments which have given satisfactory results and are not intended to restrict the invention thereto.

Example I

Span ground neoprene scrap (30 mesh) was first digested with 10% hydrochloric acid solution for 48 hours at near the boiling point. The solution during this period was twice replaced with a fresh acid solution. After completion of the acid digestion, the material was washed six times with fresh water, once with 1% sodium hydroxide solution, and six times again with water. The material was drained and then dried 24 hours at 100° C.

10% tri-cresyl-phosphate was stirred into the dried material and the product was passed three times through a tight mill to insure even wetting, which could not be satisfactorily obtained by stirring alone.

The plasticized neoprene was then subjected to 16 hours treatments in open steam of 90 lbs. pressure.

The resulting steam treated product was then passed six times through a tight mill and was taken off over a knife edge. The product milled and sheeted out satisfactorily to a smooth reclaim, rather soft but not tacky. The material was capable of being cured.

5% of light magnesium oxide and 5% of zinc oxide was milled into the composition and the composition molded and cured 30 minutes at 70 lbs. pressure, giving a slab having the following properties:

| | |
|---|---|
| Hardness | 70 |
| Elasticity | 35 |
| Tensile lbs. per sq. in. | 510 |
| Stretch | 170 |
| Specific gravity | 1.55 |

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:
1. The process of reclaiming neoprene which comprises subjecting cured neoprene containing magnesium oxide to the action of acid for sufficient time to react substantially all the magnesium oxide in the neoprene with the acid, washing out the products of the reaction, mixing a plasticizer with the acid treated neoprene, and subjecting the plasticized neoprene to a temperature substantially above room temperature.

2. The process of reclaiming neoprene which comprises subjecting ground cured neoprene scrap containing magnesium oxide to the action of hot acid for sufficient time to react substantially all the magnesium oxide with the acid, washing the acid treated neoprene to remove acid and other water soluble material, drying the washed neoprene, mixing a plasticizer with said neoprene, and subjecting the mixture to steam under superatmospheric pressure.

HERBERT A. WINKELMANN.